United States Patent
Dischler (10) Patent No.: US 10,332,171 B1
(45) Date of Patent: Jun. 25, 2019

(54) OFFLINE TO ONLINE SALES CONVERSION

(71) Applicant: Google LLC, Mountain View, CA (US)

(72) Inventor: Gerald H. Dischler, Palo Alto, CA (US)

(73) Assignee: Google LLC, Mountain View, CA (US)

(*) Notice: Subject to any disclaimer, the term of this patent is extended or adjusted under 35 U.S.C. 154(b) by 360 days.

(21) Appl. No.: 15/262,144

(22) Filed: Sep. 12, 2016

Related U.S. Application Data (63) Continuation of application No. 15/068,796, filed on Mar. 14, 2016, now abandoned, which is a continuation of application No. 11/753,396, filed on May 24, 2007, now abandoned.

(51) Int. Cl.
*G06Q 30/06* (2012.01)
*H04L 29/06* (2006.01)
*H04L 9/08* (2006.01)

(52) U.S. Cl.
CPC ....... *G06Q 30/0613* (2013.01); *H04L 9/0863* (2013.01); *H04L 63/06* (2013.01); *H04L 63/083* (2013.01); *G06Q 2220/00* (2013.01)

(58) Field of Classification Search
CPC ............ G06Q 30/0613; G06Q 2220/00; H04L 9/0863; H04L 63/06; H04L 63/083
See application file for complete search history.

(56) References Cited

U.S. PATENT DOCUMENTS

| | | | |
|---|---|---|---|
| 5,368,129 A | 11/1994 | Von Kohorn | |
| 6,314,406 B1 | 11/2001 | O'Hagan et al. | |
| 6,336,099 B1 | 1/2002 | Barnett et al. | |
| 6,584,448 B1 | 6/2003 | Laor | |
| 6,607,136 B1 * | 8/2003 | Atsmon | G06F 21/34 235/487 |
| 6,856,967 B1 | 2/2005 | Woolston et al. | |
| 6,862,575 B1 | 3/2005 | Anttila et al. | |
| 7,013,286 B1 | 3/2006 | Aggarwal et al. | |
| 7,389,251 B1 | 6/2008 | Woolston et al. | |
| 7,505,913 B2 | 3/2009 | Tobin | |
| 7,552,069 B2 | 6/2009 | Kepecs | |
| 7,555,444 B1 | 6/2009 | Wilson et al. | |
| 2002/0046082 A1 | 4/2002 | White | |
| 2002/0198777 A1 | 12/2002 | Yuasa | |
| 2003/0074259 A1 | 4/2003 | Slyman et al. | |
| 2004/0177003 A1 | 9/2004 | Liao et al. | |

(Continued)

OTHER PUBLICATIONS

Bao, Feng, "A scheme of digital ticket for personal trusted device", Sep. 2004, IEEE 15th International Symposium on Personal, Indoor and Mobile Radio Communications, vol. 4, pp. 3065-3069 (Year: 2004).*

*Primary Examiner* — Kenneth W Chang (74) *Attorney, Agent, or Firm* — Fish & Richardson P.C.

(57) ABSTRACT

Various aspects can be implemented for increasing offline to online sales conversion. In general, one aspect can be a method that includes generating a coupon identifier dynamically at a retail location based on a unique password. The method also includes assigning tracking information and a variable sales price discount associated with a variable expiration time to the coupon identifier. The method further includes issuing the coupon identifier to a customer at the retail location for use in a future online sales transaction. Other implementations of this aspect include corresponding systems, apparatus, and computer program products.

20 Claims, 4 Drawing Sheets

(56) References Cited

U.S. PATENT DOCUMENTS

| | | |
|---|---|---|
| 2004/0249712 A1 | 12/2004 | Brown et al. |
| 2005/0071230 A1 | 3/2005 | Mankoff |
| 2005/0109841 A1* | 5/2005 | Ryan .................... G06F 13/385 |
| | | 235/380 |
| 2008/0052169 A1 | 2/2008 | O'Shea et al. |
| 2008/0065495 A1 | 3/2008 | Nguyen |
| 2008/0201226 A1 | 8/2008 | Carlson et al. |
| 2008/0215489 A1* | 9/2008 | Lawson .............. G06Q 20/389 |
| | | 705/50 |
| 2010/0327054 A1* | 12/2010 | Hammad ............... G06F 21/34 |
| | | 235/375 |

* cited by examiner

OFFLINE TO ONLINE SALES CONVERSION

CROSS-REFERENCE TO RELATED APPLICATION

This application is a continuation of U.S. application Ser. No. 15/068,796, filed Mar. 14, 2016, which is a continuation of U.S. application Ser. No. 11/753,396, filed May 24, 2007, the contents of each are hereby incorporated in their entirety.

TECHNICAL FIELD

This disclosure generally relates to increasing offline (in-store) to online sales conversion by offering offline customers coupon identifiers for shopping online.

BACKGROUND

Technology has made what is already a fast-paced world even faster, with people using technology to communicate instantly and continuously, the immediate availability of products for online sales, and with next-day delivery a common occurrence. Many traditional brick-and-mortar retailers have taken advantage of this technological revolution and deployed online sales channels to increase sales volume. These online "virtual stores" or websites can often carry more inventory and a wider selection of products compared to the offline retail stores. However, the retailers typically do not have a good way to incentivize customers to make purchases online after visiting an offline retail location and not finding the product of interest in stock; and thus, their offline to online sales conversion rate can be low. Also, for those customers who do purchase online, the fact that the customer visited a retail store and interacted with a salesperson can often be lost.

SUMMARY

This specification describes various aspects for increasing offline to online sales conversion. In general, one aspect can be a method that includes generating a coupon identifier dynamically at a retail location based on a unique password. The method also includes assigning tracking information and a variable sales price discount associated with a variable expiration time to the coupon identifier. The method further includes issuing the coupon identifier to a customer at the retail location for use in a future online sales transaction. Other implementations of this aspect include corresponding systems, apparatus, and computer program products.

Another general aspect can be a system for increasing online sales associated with a retailer that includes an offline sales component configured to interact with a customer at the retailer's store. The system also includes an online sales component configured to interact with the customer via the retailer's website. The system further includes means for generating a coupon identifier that includes a variable sales price discount associated with a variable expiration time. The system additionally includes a server configured to receive the coupon identifier and determine whether the coupon identifier is valid based, at least in part, on comparing the time of receipt of the coupon identifier with the variable expiration time.

These and other general aspects can optionally include one or more of the following specific aspects. The method can include receiving the coupon identifier from another customer via an Internet connection. The method can also include determining a time of receipt of the coupon identifier and determining whether the received coupon identifier is valid based, at least in part, on comparing the time of receipt of the coupon identifier with the variable expiration time. The method can further include applying the variable sales price discount to the online sales transaction when the coupon identifier is valid. The method can additionally include tracking an offline-to-online sales conversion rate based, at least in part, on the tracking information and the receipt of the coupon identifier from the other customer.

The tracking information can include one or more of the following: a name or a title of a salesperson who issued the coupon identifier, a time at which the coupon identifier was issued, and the retail location where the coupon identifier was issued. The dynamic generation of the coupon identifier can include generating the coupon identifier in the presence of the customer at the retail location. The dynamic generation of the coupon identifier can also include obtaining a personal identification number (PIN) (e.g., associated with a salesperson) and determining whether the PIN is valid.

The variable expiration time can include one or more of the following expiration times: 30 minutes, one hour, one day, one week, or some other predetermined time. The variable sales price discount can include one or more of the following discounts: 20% discount, a 15% discount, a 10% discount, a 5% discount, or some other sales discount authorized by the retailer. The amount of the variable sales price discount can decrease as the duration of the variable expiration time increases. For example, The issuance of the coupon identifier can include delivering a message to the customer via a handheld device or via a handwritten note. The handheld device can include a mobile phone, a personal digital assistant (PDA), or a Smartphone. The message can include one or more of the following: an e-mail message, a multimedia message, a text message, and a wireless application protocol (WAP) message.

The receipt of the coupon identifier from another user can include receiving the coupon identifier at an Internet website associated with the online sales transaction. The customer present at the retail location and the other customer who uses the coupon identifier can be the same entity or they can be different entities. The unique password can include one or more passwords based on a public key encryption system. The unique password can also include one or more passwords automatically generated by a security token, which can include a hardware token or a software token. The hardware token can include a CryptoCard, a SecurID, or a smartcard.

Particular aspects can be implemented to realize one or more of the following advantages. Offline to online sales conversion rates can be increased using the coupon identifiers to motivate customers to shop online after visiting an offline retail location and not finding the product of interest in stock. Retailers can generate sales promotions with a short time duration based on the coupon identifiers, which can be tracked on a per-store or per-salesperson basis. Sales promotions based on the coupon identifiers can be available immediately on the retailer's website without requiring the salesperson who issued the coupon identifier to be online.

The device given to each salesperson for generating the coupon identifier in a store can be inexpensive, secure, portable and easy to use for any merchant that has both offline and online sales channels. The instantaneous online availability for the sales promotion can be implemented in a mobile commerce scenario. For example, customers can purchase from a retailer's website within seconds or a few minutes of receiving the promotional coupon using a handheld or mobile device, such as a personal digital assistant (PDA) or a Smartphone with online access.

The general and specific aspects can be implemented using a system, method, or a computer program, or any combination of systems, methods, and computer programs. The details of one or more implementations are set forth in the accompanying drawings and the description below. Other features, aspects, and advantages will be apparent from the description, the drawings, and the claims.

DESCRIPTION OF DRAWINGS

These and other aspects will now be described in detail with reference to the following drawings.

Like reference symbols in the various drawings indicate like elements.

DETAILED DESCRIPTION

Figure 1:
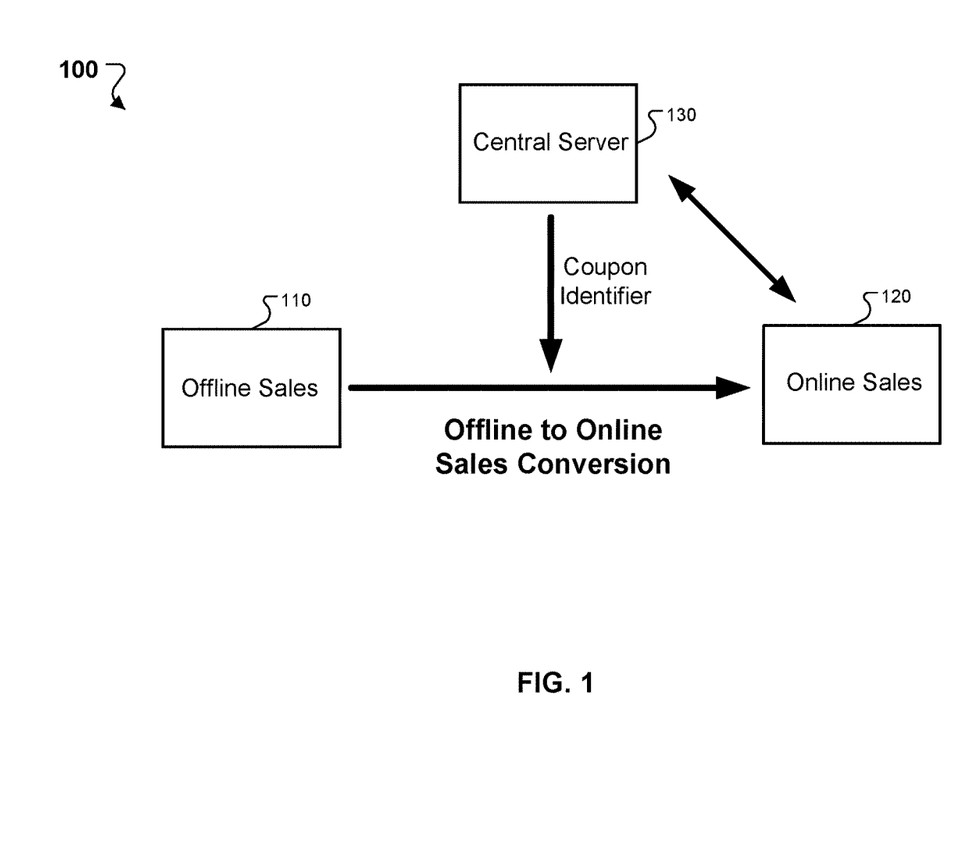
FIG. 1 is a conceptual diagram of a system that provides offline to online sales conversion by offering offline customers coupon identifiers for shopping online.

FIG. 1 is a conceptual diagram of a system 100 that provides increased offline to online sales conversion by offering offline customers coupon identifiers for shopping online. The system 100 has an offline sales component 110, which can include any sales transaction occurring at a traditional brick-and-mortar retail store. The system 100 also has an online sales component 120, which can include any e-commerce sales transaction occurring through a retailer's website.

Further, a central server 130 is communicatively coupled to the online sales component 120. Alternatively, the central server 130 can be communicatively coupled to the offline sales component 110. In this manner, the central server 130 can manage sales transactions by tracking both online and offline sales. Additionally, the central server 130 can generate offline to online sales conversion data on a per store and per salesperson basis. The central server 130 can include a database of salesperson information corresponding to the personal identification number (PIN) issued to each salesperson. The central server 130 can also have an encryption module that provides secure passwords and coupon identifiers. These passwords can be one-time use only and can have a variable time duration predetermined by the salesperson.

An operational overview of the offline to online sales conversion system 100 can be illustrated with the following example. Suppose that Jim goes into a clothing retail store but can't find his size for a particular shirt of interest to him. Jim then asks the salesperson whether the retail store has the shirt in his size. The salesperson tells Jim that they don't have his size in stock at the retail store, but the shirt is available through the store's website. In order to keep Jim's business and as an incentive for him to shop online, the salesperson offers Jim certain variable sales discounts if he buys from the store's website within a given time period. For example, the salesperson can offer Jim a 15% discount if Jim orders within the next 30 minutes (e.g., via his mobile phone) or a 5% discount if Jim order online by the end of the day.

The central server 130 can have functionality in place to manage the issuing of password/security tokens and assigning them with tracking information, which can include information of salespeople or sales locations. The salesperson takes out her security token, enters in her personal identification number (PIN) to verify her identity securely (and to prevent theft or abuse of the device), and writes down a number (e.g., on the retail store's or the salesperson's business card). This number is a one-time coupon code/identifier that allows Jim to obtain a discount when he buys the shirt through the retail store's website. Additionally, the coupon identifier is also associated with a tracking information that identifies the salesperson who issued the coupon to Jim.

In one implementation, the coupon identifier can be emailed to Jim with an embedded hyperlink to the retail store's website; thus, when Jim clicks on the hyperlink to make an online purchase, the retail store's website can automatically recognize the coupon identifier and apply the appropriate amount of discount to Jim's purchase. Alternatively, the coupon identifier can be sent to Jim's mobile device (e.g., a Smartphone) via a text message (e.g., SMS), a multimedia message (e.g., MMS), or a wireless application protocol (WAP) message. In this manner, Jim can conveniently use his mobile device to make an online purchase, while taking advantage of the promotional sales discount.

On the retail store's website, there can be functionality for recognizing the coupon identifier issued by the in-store salesperson. Additionally, the central server 130 communicates with the retail store's online website for tracking offline to online sales conversion. The retailer can set coupon expiration times (in minutes, hours or days) on a per channel basis (mobile versus web, for example) and can set up more complex promotional campaigns. For example, the store can offer coupons having special discount rates associated with a weekend in-store sale. When the in-store sale period is over, new coupons issued would revert back to the pre-sale rate. There can also be various reporting functionality associated with the use of the coupon identifier, such as tracking information that includes the salesperson who issued each coupon, time of issue and retrieval, number and dollar value of coupons issued over time, etc.

Figure 2:
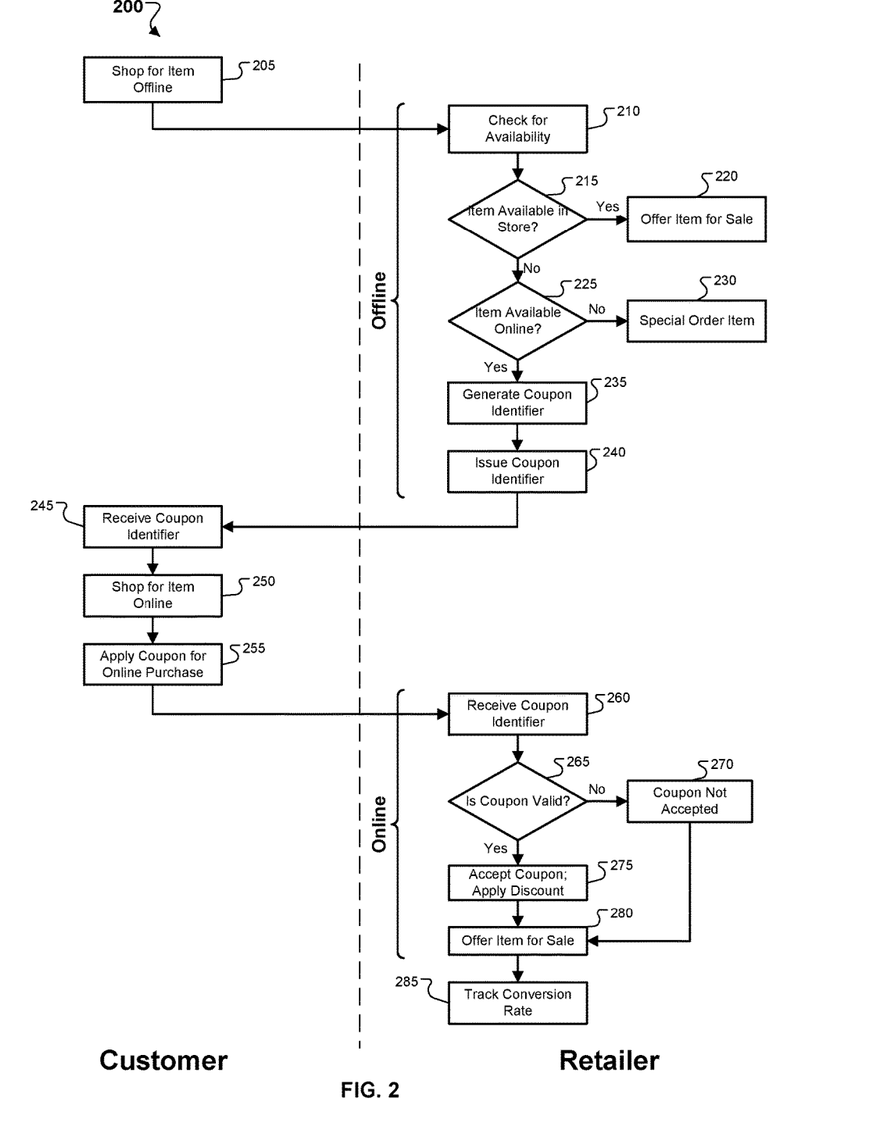
FIG. 2 is a customer-retailer flow chart illustrating a process for providing offline to online sales conversion.

FIG. 2 is a customer-retailer flow chart illustrating a process 200 for providing offline to online sales conversion. In the example, a retail store offers merchandise for sale through both offline sales and online sales channels. Alternatively, the retail store may not have an online sales channel. In such case, the retail store can have a prearranged referral program with an online merchant. Offline sales is a general term used herein to encompass all sales transactions that occur through traditional brick-and-mortar retail locations. On the other hand, online sales is a general term used herein to encompass all sales transactions that occur through a retail store's website.

At 205, the customer enters the retailer's retail store to shop for a particular item of interest. If the customer does not find the item of interest available (e.g., if the customer's size is not available on the shelves), the customer may ask the salesperson at the retail store for availability information. At 210, the salesperson checks for the availability in the store's inventory. At 215, if the item is available in store, the salesperson, at 220, locates the item in store and offers the item for sale. Typically, not all the items are displayed on the shelves in the store and the salesperson may have to go back to the store's stock room to retrieve the item of interest.

Alternatively, the item may already be on display in the store and the salesperson can point the customer to the right location in the store.

On the other hand, if the item is not available in the store, at 225, the salesperson checks to see if the item is available for sale online through the retailer's website. Generally, the retailer's website can carry more inventory and a wider selection of products compared to the offline retail locations because a centralized warehouse at a less expensive location can be used to stock the products. Additionally, the products can be shipped from the retailer's centralized warehouse directly to the customer. At 230, if the item is also not available through the retailer's website, the salesperson can offer to special order the item for the customer. In this case, the customer may have to pay for shipping cost and additionally charges for the special order.

However, if the item of interest is available online through the retailer's website, at 235, the salesperson generates a coupon identifier associated with a promotional sales discount. The promotional sales discount can be a certain percentage off the sales price and/or a waiver on the shipping cost. Since there is no way for the salesperson to know whether the customer actually made a purchase through the retailer's website, this coupon identifier can incentivize the customer to make an online purchase through the retailer's website and provide online sales feedback to the salesperson. In this manner, the coupon identifier can be used to track and increase the offline to online sales conversion. This coupon identifier can be a one-time password produced by an encryption system, such as the public-key encryption system. Further details of how this coupon identifier can be generated will be discussed below.

Additionally, the salesperson can configure the coupon identifier with a variable expiration time so that the coupon expires after a short period of time, or a longer period of time. For example, the coupon can expire after one month, one week, one day, one hour, or any predetermined period of time. Additionally, the amount of sales discount associated with the coupon can be variable based on how soon the customer makes the online purchase. For example, the coupon may offer a 15% discount if the customer makes an online purchase within an hour; a 10% discount if the customer makes an online purchase within a day; a 5% discount if the customer makes an online purchase within a week, and so forth. In this manner, the coupon can provide an incentive for the customer to make that online purchase as soon as possible after the customer leaves the offline store.

At 240, the salesperson issues the coupon identifier to the customer for use in the online purchase. At 245, the customer receives the coupon identifier from the salesperson. As noted above, the issuance or delivery of the coupon identifier can be done via a handwritten note (e.g., by the salesperson writing it down and handing the coupon identifier to the customer), or via a handheld device (e.g., by the salesperson sending a message, which can be an email, an SMS message, a WAP message to the customer's mobile device or any other computing device). Alternatively, the retail store may already have a kiosk or Internet stations for ordering directly from the retailer's website. Thus, the coupon identifier can be applied immediately by the customer while still in the store.

In order to take advantage of the promotional sales discount associated with the coupon identifier, at 250, the customer initiates an online connection and shops for the item of interest on the retailer's website. The customer who received the coupon identifier from the in-store salesperson does not have to be the same person who initiates the online connection. For example, Jim may have received the coupon identifier, but Jim's wife can make the online purchase for him. In one implementation, once the customer is connected to the retailer's website, the coupon identifier can be used as a log-in password for the customer. This implementation assumes that all the customer information has previously been entered by the salesperson at the retail store.

At 255, the customer applies the discount coupon to the online purchase for the item of interest. Alternatively, the coupon identifier can be applied automatically, for example, if the customer accesses the retailer's website directly from the hyperlink embedded in the message sent to the customer. At 260, the retailer's website receives the coupon identifier. As noted above, this can be either manually entered by the customer or automatically through the embedded hyperlink in the message. Alternatively, the coupon identifier can be associated with the log-in information for shopping online.

Once the coupon identifier is received by the retailer's website, at 265, the coupon's validity is determined. The determination of the coupon's validity can be based primarily on whether the coupon has expired or has already been used. The coupon identifier can be invalid for various reasons; for example, the coupon identifier may have already expired, or the coupon identifier may have already been used. Additionally, the coupon identifier may not have been issued by an authorized salesperson, or the customer may try to apply the coupon identifier to a different item. As noted above, the coupon identifier can have a variable expiration time associated with a variable sales price discount. In one implementation, the variable expiration time means that the amount of sales discount decreases with increasing expiration time. Ultimately, the coupon identifier does have an expiration time.

If the coupon identifier is not valid, at 270, the coupon is not accepted and the website may prompt the customer to enter the coupon identifier again (e.g., in case the wrong identifier was entered). Additionally, a message can be displayed indicating to the customer why the coupon is not valid. At 280, even if the coupon identifier is not valid, the retailer's website can still offer the item for sale without any discount. On the other hand, if the coupon identifier is valid, at 275, the coupon is accepted and the promotional discount associated with the coupon is applied to the item. At 280, the retailer's website offers the item for sale with the appropriate discount included.

At 285, the offline to online sales conversion rate can be tracked because the coupon identifier can provide tracking information that includes which offline store the customer visited and which salesperson assisted the customer and issued the coupon identifier to the customer. In this manner, the salesperson can be rewarded for the online sales purchase and the retail store can get credit for the online sales volume. Additionally, the retailer can evaluate how the promotional sales discount can drive the online sales volume based on the percentage of discount. Furthermore, using this information the retailer can update the inventory at the retail store based on what items are in high demand by the customers.

Figure 3:
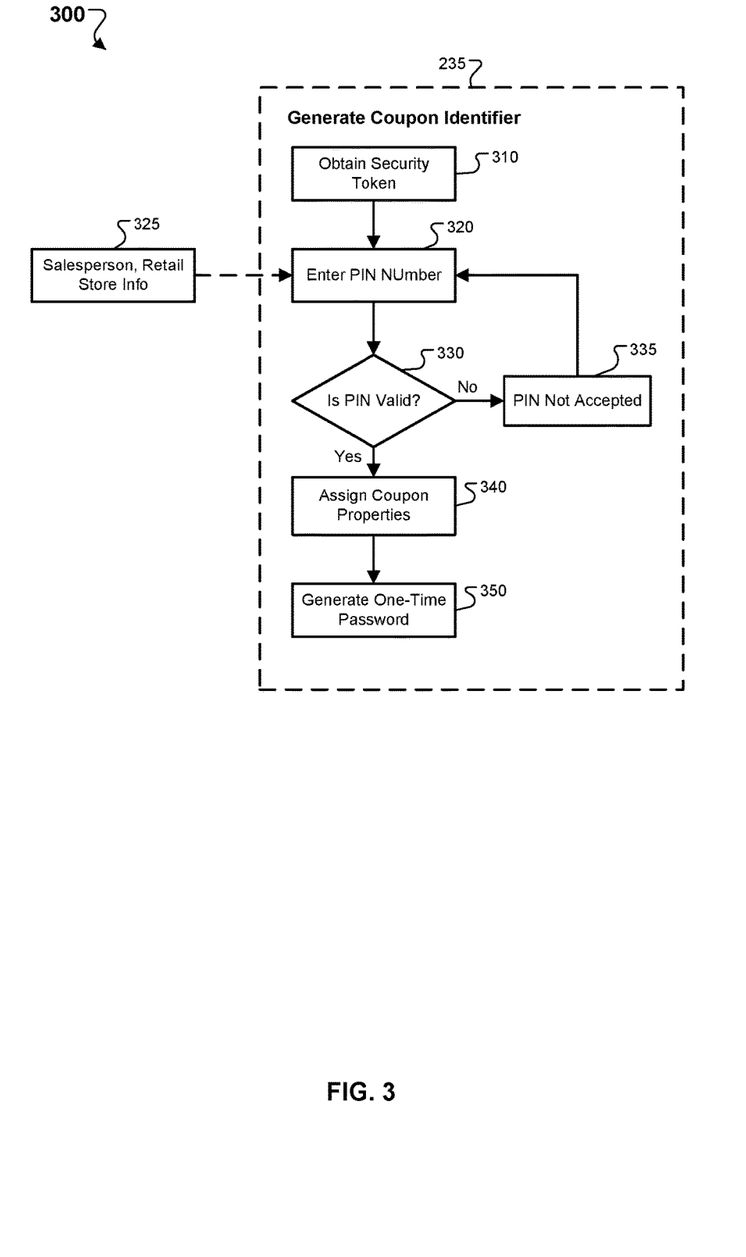
FIG. 3 is a flow chart illustrating a process for generating a coupon identifier.

FIG. 3 is a flow chart illustrating a process 300 for generating a coupon identifier. At 310, a salesperson obtains a security token, which can be a software token or a hardware token. Software tokens can be generated by computer software. Hardware tokens can typically be small enough (e.g., a key fob, a pocket-size card) to be carried in a pocket or purse and often are designed to attach to the user's keychain. Hardware tokens can store cryptographic keys, such as a digital signature, or biometric data, such as a fingerprint, used for encryption systems. Hardware tokens can be designed to be tamper resistant, and some can also include small keypads to allow entry of a PIN.

In one implementation, the security token can be a CryptoCard, which produces a new one-time password each time its button is pressed. The process 300 can be configured to accept several forward password values in case the button is pressed more than once by accident, or if the password failed to authenticate. In another implementation, the security token can be an RSA Security's SecurID, which displays a one-time password that changes at a set time interval. The salesperson can enter the one-time password along with her PIN when authenticating. In yet another implementation, the security token can be a smartcard, which is a pocket-sized card with embedded integrated circuits.

The security token can be associated with the salesperson at the offline store. Depending on the scale of deployment for the security tokens, the retailer may only issue these security tokens to sales managers or sales supervisors at the retail locations. In one implementation, there can be one security token associated with a particular offline retail store. Alternatively, the retailer may issue these security tokens to all the salespeople at all the offline retail locations. Additionally, the security tokens can be configured with variable authorization levels to allow issuance of certain sales promotions based on the employee's job title. As an example, the security tokens can be configured so that floor salespeople may only issue coupons for free shipping charge and up to a 10% sales discount; on the other hand, the sales managers or supervisors may have the authority to issue coupons for a higher sales discount.

In one implementation, the process 300 (e.g., the central server 130 of FIG. 1) can have functionality in place to manage the issuance of the security tokens and configure certain authorization levels based on the job title. At 320, after the salesperson has obtained the security token (e.g., either issued to her or obtained from a manager), she then enters in her personal identification number (PIN) to verify her identity and to prevent theft or abuse of the device. The PIN can be a password (e.g., numerical, alphanumerical, or a combination of the two) that the salesperson selected when she first obtained the security token. At 325, the PIN can be associated with a database that provides information on a particular salesperson and a particular retail store. For example, the information can include the salesperson's job title and authorization level; or the information can include the location of the retail store.

At 330, the process 300 determines whether the PIN entered by the salesperson is valid. The PIN can be used to provide an additional level of security and prevent misuse of the security token. If the PIN is invalid, at 335, the PIN is rejected and the salesperson is prompted to enter the PIN again. In one implementation, the process 300 can be configured to refuse access to the salesperson if the PIN is still invalid after a predetermined number (e.g., three) of attempts. At 340, if the PIN is valid, the process 300 accepts the PIN and grants the salesperson access and authority to assign coupon properties.

As noted above, the salesperson can assign an expiration date and a percentage of sales discount associated with the coupon. Alternatively, the expiration date and a percentage of sales discount associated with the coupon can be assigned centrally through a sales campaign management. For example, the salesperson or the sales campaign management can configure the coupon identifier so that the coupon expires after a short period of time, such as one week, one day, one hour, or any predetermined period of time. Additionally, the amount of discount associated with the coupon can be variable based on how soon the customer makes the online purchase. For example, the salesperson or the sales campaign management may assign a 15% discount for the coupon that expires within an hour; a 10% discount for the coupon that expires within a day; a 5% discount for the coupon that expires within a week; and any other combination of time duration and percentage discount.

At 350, the process 300 generates a one-time password, which can be associated with the coupon identifier. In one implementation, the one-time password can be generated by a time-synchronized technique based on the security tokens. For example, each user is given a personal token that generates a one-time password. Inside the security token there can be a clock that has been synchronized with the clock on an authentication server (e.g., the central server 130 of FIG. 1). In the time-synchronized technique, time is an important part of the password generation algorithm, and a new password can be generated based on the time.

In another implementation, the process 300 can use a mathematical algorithm to generate a new password based on the previous password. For example, a one-way hash function (e.g., hash function f( )) can be used to generate a series of passwords starting with an initial seed password (e.g., f(s), f(f(s)), f(f(f(s))), . . . ). If an indefinite series of passwords is wanted, a new seed value can be chosen after the set for s is exhausted. After the series of passwords is generated by the hash function, each password is dispensed for a predetermined time period in reverse (e.g., with f(f(f(s))) dispensed first, then f(f(s)), then f(s)). If an intruder obtains one of the series of one-time passwords, he may have access for one time period or login, but it becomes useless once that period expires. To get the next password in the series from the previous passwords, one needs to find a way of calculating the inverse function of the hash function. Since hash function can be deliberately chosen to be one-way, this can be extremely difficult to do. If a cryptographic hash function is used, which is generally the case, it can be a computationally impossible task.

Figure 4:
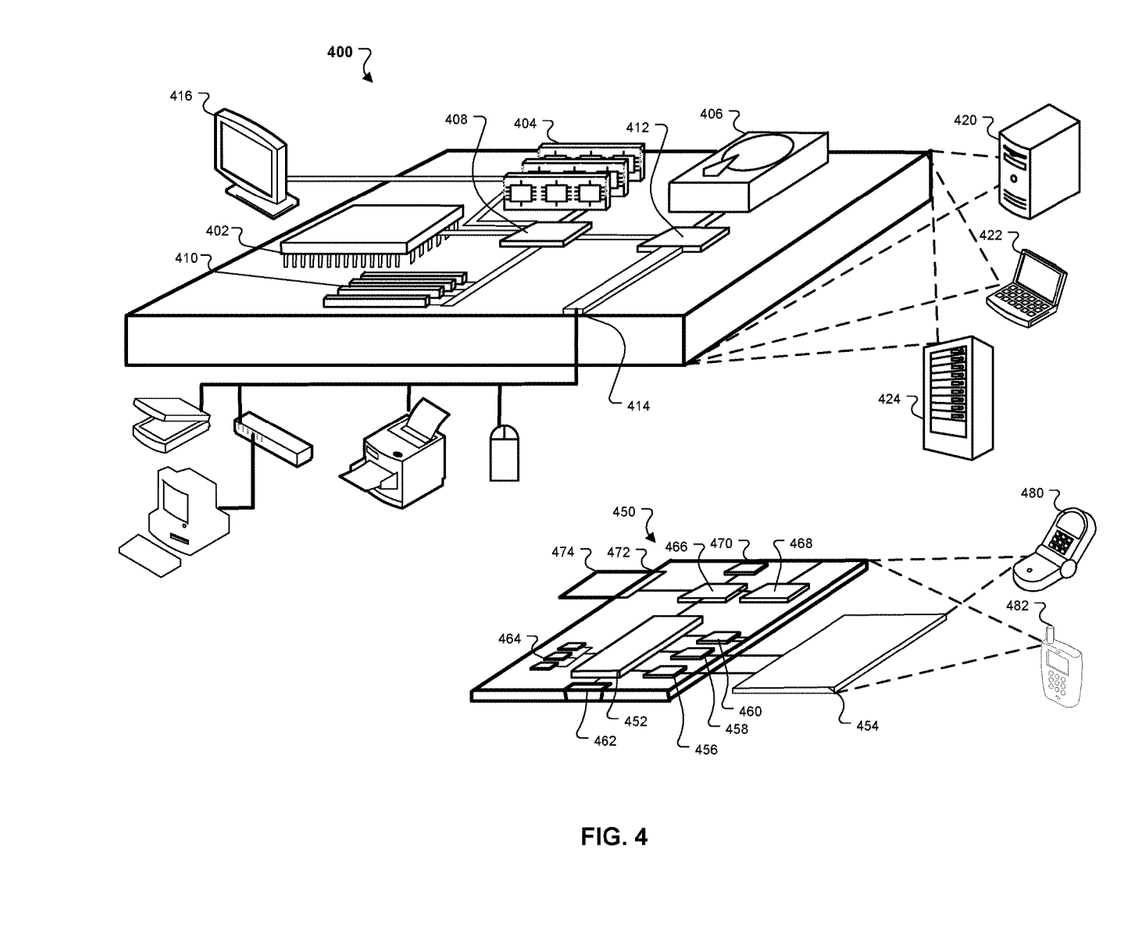
FIG. 4 is a block diagram of computing devices and systems.

FIG. 4 is a block diagram of computing devices and systems 400, 450. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and can be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses can be used, as appropriate, along with multiple memories and types of memory. Also, multiple computing devices 400 can be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 can be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which can accept various expansion cards (not shown). In the implementation, low-speed controller 412 is coupled to storage device 406 and low-speed expansion port 414. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 400 can be implemented in a number of different forms, as shown in the figure. For example, it can be implemented as a standard server 420, or multiple times in a group of such servers. It can also be implemented as part of a rack server system 424. In addition, it can be implemented in a personal computer such as a laptop computer 422. Alternatively, components from computing device 400 can be combined with other components in a mobile device (not shown), such as device 450. Each of such devices can contain one or more of computing device 400, 450, and an entire system can be made up of multiple computing devices 400, 450 communicating with each other.

Computing device 450 includes a processor 452, memory 464, an input/output device such as a display 454, a communication interface 466, and a transceiver 468, among other components. The device 450 can also be provided with a storage device, such as a microdrive or other device, to provide additional storage. Each of the components 450, 452, 464, 454, 466, and 468, are interconnected using various buses, and several of the components can be mounted on a common motherboard or in other manners as appropriate.

The processor 452 can process instructions for execution within the computing device 450, including instructions stored in the memory 464. The processor can also include separate analog and digital processors. The processor can provide, for example, for coordination of the other components of the device 450, such as control of user interfaces, applications run by device 450, and wireless communication by device 450.

Processor 452 can communicate with a user through control interface 458 and display interface 456 coupled to a display 454. The display 454 can be, for example, a TFT LCD display or an OLED display, or other appropriate display technology. The display interface 456 can comprise appropriate circuitry for driving the display 454 to present graphical and other information to a user. The control interface 458 can receive commands from a user and convert them for submission to the processor 452. In addition, an external interface 462 can be provide in communication with processor 452, so as to enable near area communication of device 450 with other devices. External interface 462 can provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 can also be provided and connected to device 450 through expansion interface 472, which can include, for example, a SIMM card interface. Such expansion memory 474 can provide extra storage space for device 450, or can also store applications or other information for device 450. Specifically, expansion memory 474 can include instructions to carry out or supplement the processes described above, and can include secure information also. Thus, for example, expansion memory 474 can be provide as a security module for device 450, and can be programmed with instructions that permit secure use of device 450. In addition, secure applications can be provided via the SIMM cards, along with additional information, such as placing identifying information on the SIMM card in a non-hackable manner.

The memory can include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal.

Device 450 can communicate wirelessly through communication interface 466, which can include digital signal processing circuitry where necessary. Communication interface 466 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 468. In addition, short-range communication can occur, such as using a Bluetooth, WiFi, or other such transceiver (not shown). In addition, GPS receiver module 470 can provide additional wireless data to device 450, which can be used as appropriate by applications running on device 450.

Device 450 can also communication audibly using audio codec 460, which can receive spoken information from a user and convert it to usable digital information. Audio codex 460 can likewise generate audible sound for a user, such as through a speaker, e.g., in a handset of device 450. Such sound can include sound from voice telephone calls, can include recorded sound (e.g., voice messages, music files, etc.) and can also include sound generated by applications operating on device 450.

The computing device 450 can be implemented in a number of different forms, as shown in the figure. For example, it can be implemented as a cellular telephone 480. It can also be implemented as part of a smartphone 482, personal digital assistant, or other similar mobile device.

Where appropriate, the systems and the functional operations described in this specification can be implemented in digital electronic circuitry, or in computer software, firmware, or hardware, including the structural means disclosed in this specification and structural equivalents thereof, or in combinations of them. The techniques can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform the described functions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, aspects of the described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications can be made without departing from the spirit and scope of the described implementations. For example, the actions recited in the claims can be performed in a different order and still achieve desirable results. Additionally, the generation of the coupon identifier can be done through software, which does not need to be Internet-enabled. For example, the software implementation of security functions can be similar to the algorithms used by SecurID or CryptoCard. Furthermore, a high-speed reliable online network can be built with an interface via the point of sales to generate coupon identifiers. For example, a web service and a digital certificate-based authentication scheme can be used. However, this implementation can be more costly for the retailers since it requires a deeper level of integration than the offline systems. Accordingly, other implementations are within the scope of the following claims.

What is claimed is:

1. A computer-implemented method comprising:
   detecting, by a computer system, a security token that is associated with a given entity;
   authenticating, by the computer system, the security token;
   accepting, by the computer system and from the given entity, input requesting a code based on the authentication of the security token, data identifying the given entity, and an encryption key;
   in response to receiving the input, generating, by the computer system, the code that provides access to an item online and identifies a particular store as an origin of the code;
   encrypting the code using the encryption key;
   providing the code to a client device;
   receiving data indicating that the encrypted code has been input online;

decrypting the code using the encryption key;
in response to receiving the code, confirming that the code is valid;
receiving data indicating that the item was obtained using the code; and
storing data indicating that the item was obtained online using the code and associating the obtained item with the particular store based on the code.

2. The method of claim 1, wherein the code is further based on data identifying a time at which the code was generated.

3. The method of claim 1, wherein generating the code comprises generating the code for one-time use.

4. The method of claim 1, comprising:
obtaining authenticating information with the input requesting the code; and
authenticating the request based on the authenticating information.

5. The method of claim 1, wherein the code is further based on data identifying a variable expiration time that comprises one or more of the following expiration times: 30 minutes, one hour, one day, or one week.

6. The method of claim 1, wherein providing the code comprises transmitting the code over a network to the client device.

7. The method of claim 6, wherein transmitting the code over the network comprises including the code in one or more of the following messages: an e-mail message, a multimedia message, a text message, and a wireless application protocol (WAP) message.

8. The method of claim 5, comprising:
determining a time of redemption the code; and
comparing the time of redemption with the variable expiration time,
wherein confirming that the code is valid is based, at least in part, on the comparing.

9. The method of claim 8, wherein receiving the data indicating redemption of the code comprises receiving the code at an Internet website.

10. The method of claim 1, wherein the code is encrypted using a public key encryption system.

11. The method of claim 1, wherein generating the code comprises generating the code in real-time in response to receiving the input requesting the code.

12. The method of claim 1, wherein the code does not exist prior to the generating.

13. The method of claim 1, comprising:
determining that the item is available online,
wherein the code is generated in response to determining that the item is available online.

14. The method of claim 1, comprising:
receiving a one-time password that is generated by the security token; and
comparing the one-time password to one or more time-synchronized passwords generated by the computer system,
wherein authenticating the security token is based on comparing the one-time password to one or more time-synchronized passwords generated by the computer system.

15. The method of claim 1, comprising:
receiving a PIN input,
wherein the security token is authenticated based on the received PIN matching a stored PIN that is associated with the security token.

16. The method of claim 1, wherein the security token is a hardware implemented security token.

17. A system comprising:
one or more computers and one or more storage devices storing instructions that are operable, when executed by the one or more computers, to cause the one or more computers to perform operations comprising:
detecting, by a computer system, a security token that is associated with a given entity;
authenticating, by the computer system, the security token;
accepting, by the computer system and from the given entity, input requesting a code based on the authentication of the security token, data identifying the given entity, and an encryption key;
in response to receiving the input, generating, by the computer system, the code that provides access to an item online and identifies a particular store as an origin of the code;
encrypting the code using the encryption key; providing the code to a client device;
receiving data indicating that the encrypted code has been input online;
decrypting the code using the encryption key;
in response to receiving the code, confirming that the code is valid;
receiving data indicating that the item was obtained using the code; and
storing data indicating that the item was obtained online using the code and associating the obtained item with the particular store based on the code.

18. The system of claim 17, wherein the operations further comprise:
receiving a one-time password that is generated by the security token; and
comparing the one-time password to one or more time-synchronized passwords generated by the computer system,
wherein authenticating the security token is based on comparing the one-time password to one or more time-synchronized passwords generated by the computer system.

19. The system of claim 17, wherein the operations further comprise:
receiving a PIN input,
wherein the security token is authenticated based on the received PIN matching a stored PIN that is associated with the security token.

20. A non-transitory computer-readable medium storing software comprising instructions executable by one or more computers which, upon such execution, cause the one or more computers to perform operations comprising:
detecting, by a computer system, a security token that is associated with a given entity;
authenticating, by the computer system, the security token;
accepting, by the computer system and from the given entity, input requesting a code based on the authentication of the security token, data identifying the given entity, and an encryption key;
in response to receiving the input, generating, by the computer system, the code that provides access to an item online and identifies a particular store as an origin of the code;
encrypting the code using the encryption key;
providing the code to a client device;
receiving data indicating that the encrypted code has been input online;

decrypting the code using the encryption key;
in response to receiving the code, confirming that the code is valid;
receiving data indicating that the item was obtained using the code; and
storing data indicating that the item was obtained online using the code and associating the obtained item with the particular store based on the code.

\* \* \* \* \*

UNITED STATES PATENT AND TRADEMARK OFFICE
CERTIFICATE OF CORRECTION

PATENT NO. : 10,332,171 B1
APPLICATION NO. : 15/262144
DATED : June 25, 2019
INVENTOR(S) : Dischler Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 456 days.

Signed and Sealed this
Seventh Day of January, 2020

Andrei Iancu
*Director of the United States Patent and Trademark Office*